Oct. 11, 1927. 1,644,729

S. E. JOHANNESEN

STATIONARY INDUCTION APPARATUS

Filed Feb. 21, 1922 5 Sheets-Sheet 1

Inventor:
Svend E. Johannesen
by Albert H. David
His Attorney.

Inventor:
Svend E. Johannesen,
by Albert G. Davis
His Attorney.

Oct. 11, 1927.
S. E. JOHANNESEN
1,644,729
STATIONARY INDUCTION APPARATUS
Filed Feb. 21, 1922     5 Sheets-Sheet 3
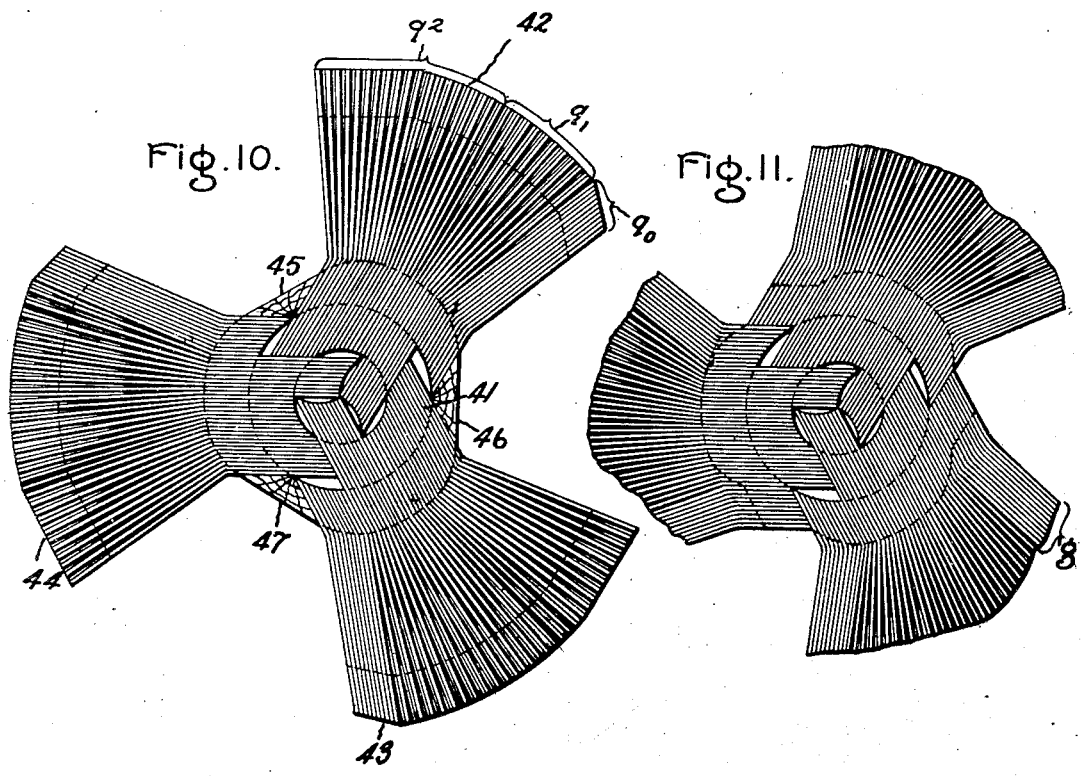
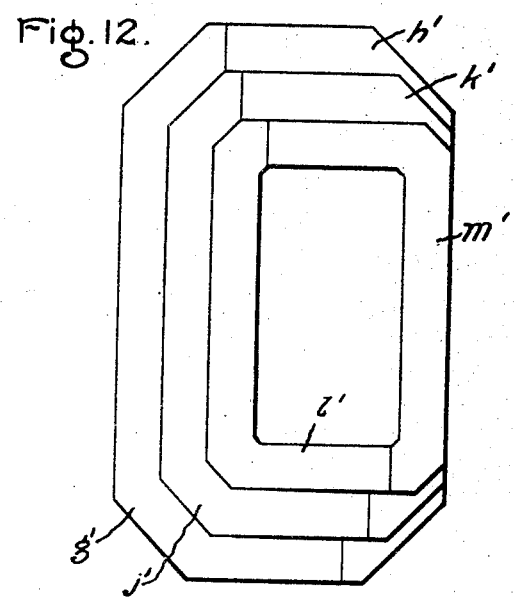
Inventor:
Svend E. Johannesen,
by Albert G. Davis
His Attorney.

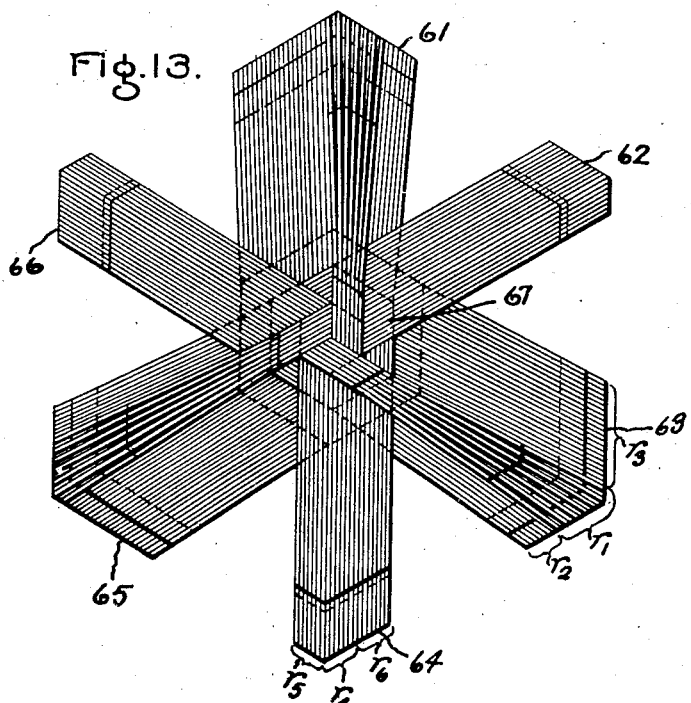
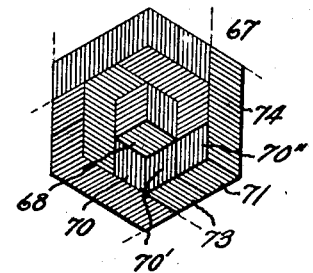
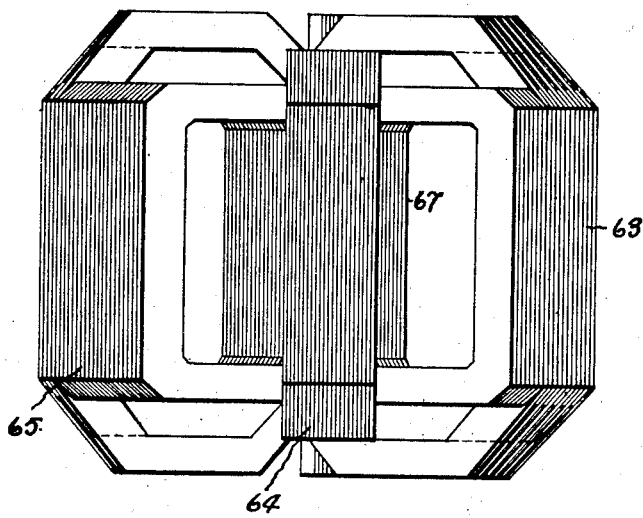
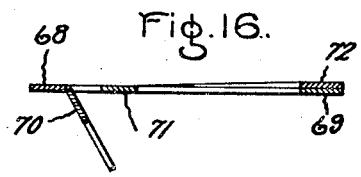
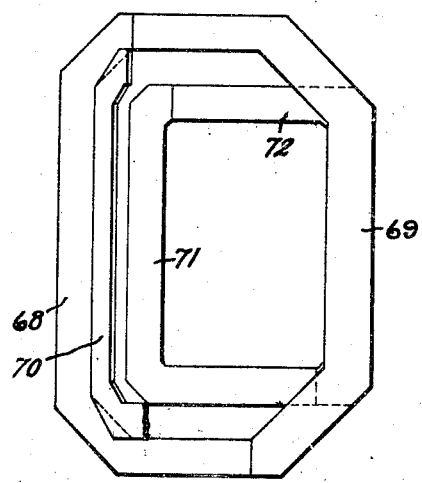
Inventor:
Svend E. Johannesen,
by Albert G. Davis
His Attorney.

Oct. 11, 1927. 1,644,729
S. E. JOHANNESEN
STATIONARY INDUCTION APPARATUS
Filed Feb. 21, 1922   5 Sheets-Sheet 5
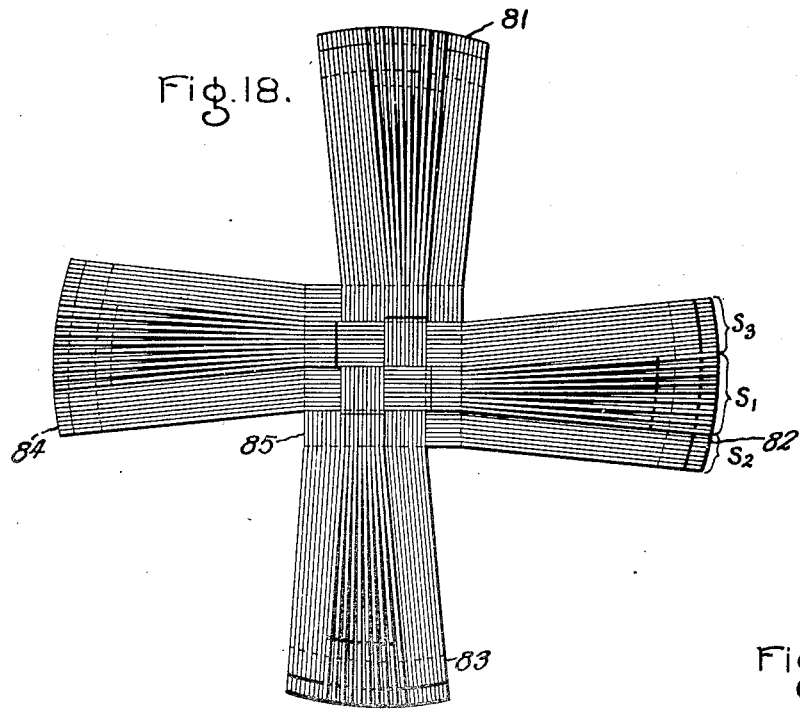
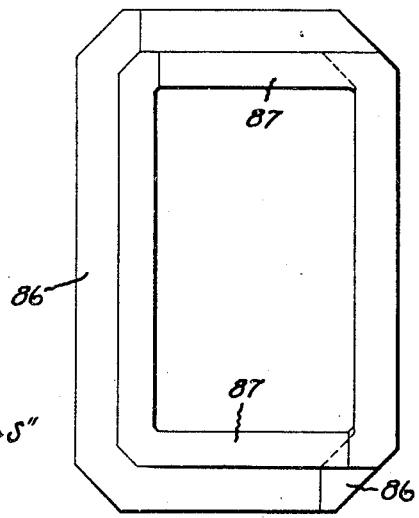
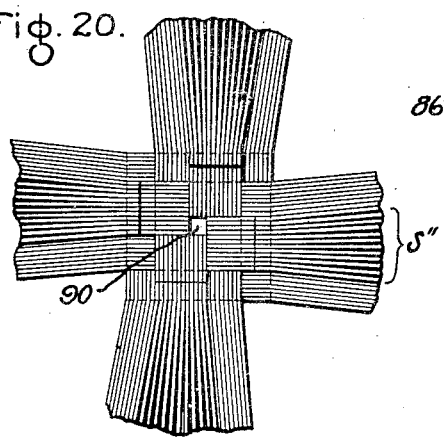
Inventor:
Svend E. Johannesen,
by Albert G. Davis
His Attorney.

Patented Oct. 11, 1927.

1,644,729

UNITED STATES PATENT OFFICE.

SVEND E. JOHANNESEN, OF PITTSFIELD, MASSACHUSETTS, ASSIGNOR TO GENERAL ELECTRIC COMPANY, A CORPORATION OF NEW YORK.

STATIONARY INDUCTION APPARATUS.

Application filed February 21, 1922. Serial No. 538,306.

My invention relates to stationary induction apparatus and has for its object the provision of an improved construction and arrangement of parts.

More particularly, my invention relates to stationary induction apparatus of the distributed core type, a specific object being an improved construction and arrangement of the core laminations whereby operating efficiencies are improved and economy in material is effected.

In distributed cores for transformers and the like it has been recognized as desirable to have the mean length of the electrical conductor or copper turn wound about the central leg made as short as possible, which means of course that the mean copper turn should be made to approach the arc of a circle as nearly as possible. Many constructions of such cores whose central legs do more or less approach the arc of a circle have been proposed. By my present invention, an arrangement of the laminations is provided which effects a shortening of the mean magnetic circuit, and which therefore permits either a reduction in the amount of iron employed and a consequent lowering of the magnetizing current for apparatus of the same rating or else a higher rating for apparatus using the same magnetizing current. This is accomplished by the use of narrower lamination sections in the outside core legs and by superposing these sections or at least a part of them in such manner as to shorten the magnetic circuits of the core.

Figure 1:
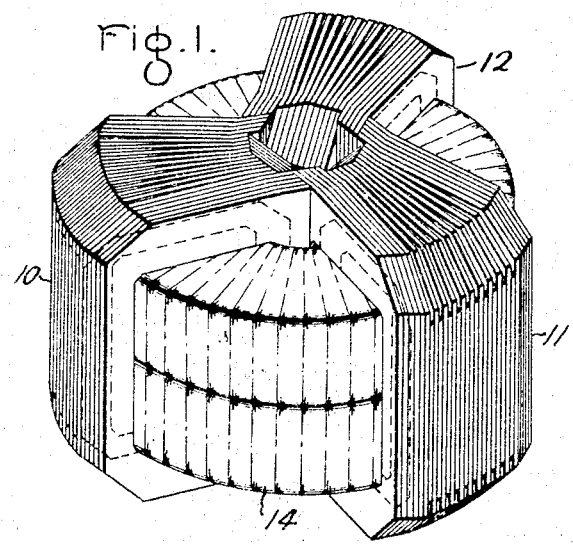
Figure 2:
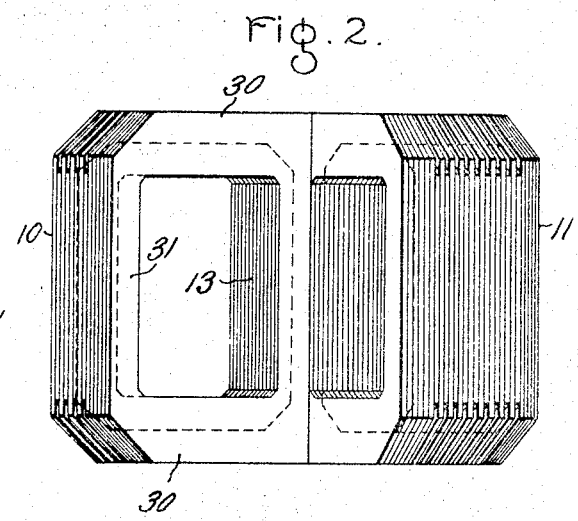
Figure 6:
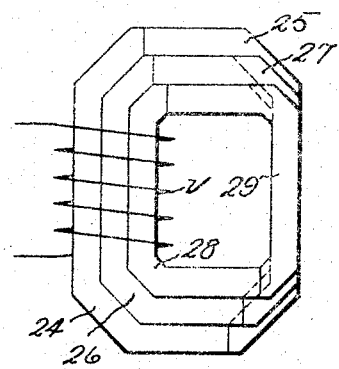
Figure 5:
Figure 7:
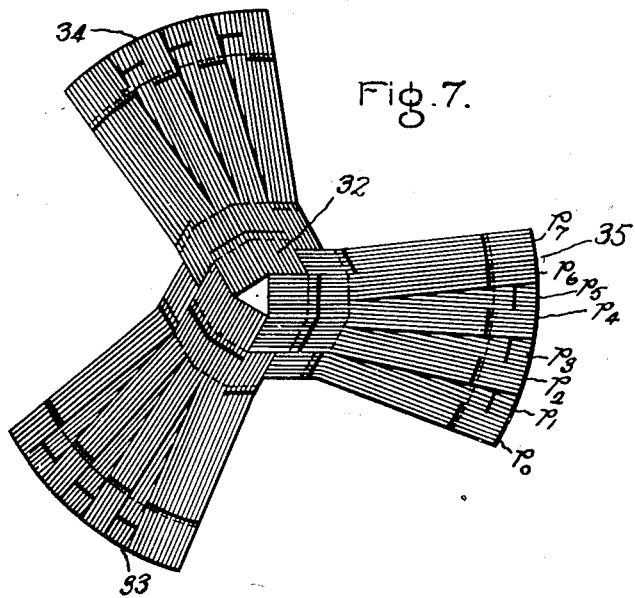
Figures 8, 9:
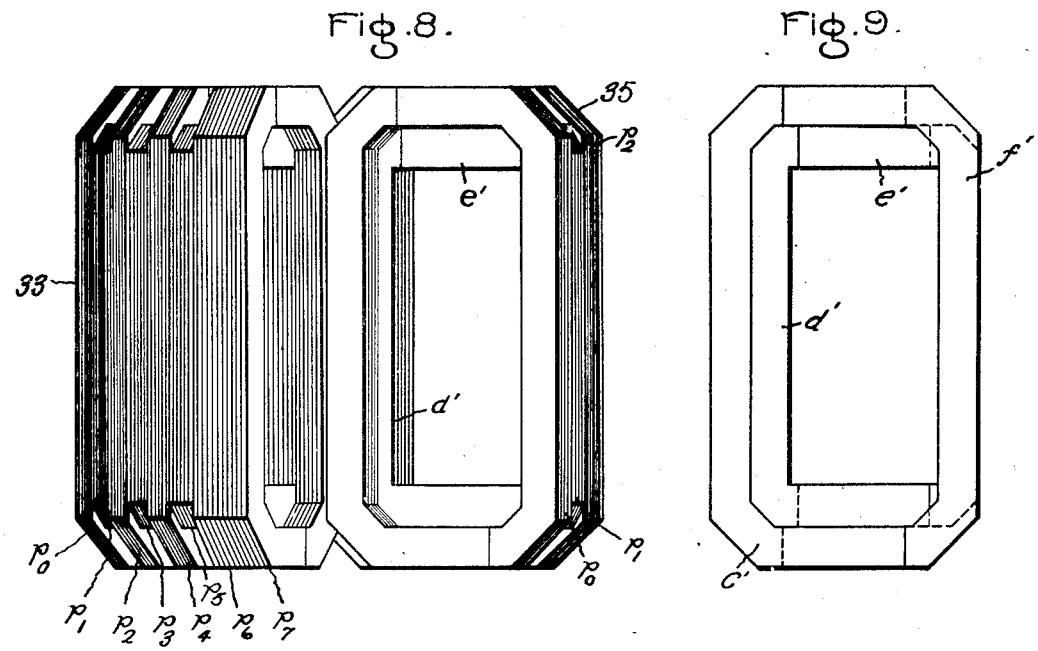

For a more complete understanding of the nature and objects of my invention, reference should be had to the following detailed description taken in connection with the accompanying drawings in which Fig. 1 is a perspective view of a distributed core type transformer embodying my invention; Fig. 2 is a side elevation of the core shown in Fig. 1; Figs. 3 to 6 are explanatory views of core laminations; Figs. 7 and 8 are respectively a plan and a side elevation of another form of core embodying my invention; Fig. 9 is a view of part of the laminations shown in Figs. 7 and 8; Figs. 10 and 11 show two more still different cores embodying the invention; Fig. 12 shows the arrangement of part of the laminations of the cores of Figs. 10 and 11; Figs. 13 and 14 show respectively a plan and an elevation of another form of core embodying the invention; Fig. 15 is a cross-section of the central leg of the cores of Figs. 13 and 14; Figs. 16 and 17 are respectively a cross section and an elevation of part of the laminations of the cores shown in Figs. 13 and 14; Fig. 18 shows another core embodying the invention; Fig. 19 shows the arrangement of part of the laminations of the core shown in Fig. 18; and Fig. 20 shows another core embodying the invention.

In the particular embodiment of the invention illustrated in Figs. 1 and 2, a laminated magnetic core includes the three outer legs 10, 11 and 12 and a central winding leg 13 about which are the transformer windings 14. The core, as indicated, is made up of three groups of laminations, a portion of each group being peculiarly arranged in a manner which will be described presently. These groups of laminations are dovetailed together giving the assembled appearance indicated in the drawing.

Figure 3:
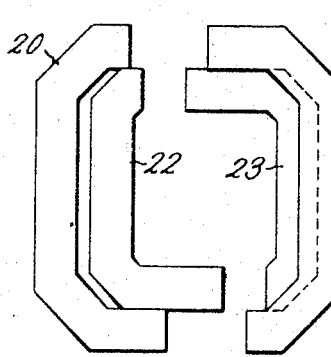

Fig. 3 illustrates a typical set of partly assembled lamination sections 20, 21, 22 and 23. These four lamination sections are in the form of four substantially L-shaped members which are butted together in two pairs to yield the two substantially O-shaped lamination elements shown assembled in Figs. 4 and 5. In the assembled arrangement shown in Figs. 4 and 5, the sections 20 and 22 are placed edge to edge so as to form one layer in the same plane and the sections 21 and 23 are superposed or placed face to face so as to form two layers in parallel planes. Stated in another way, the O-shaped lamination element comprising the sections 20 and 21 surrounds an opening or window at least as long as the other O-shaped element formed by the sections 22 and 23 and the latter element is arranged with one side projecting into the window of the former or longer element but with its other side disposed outside of this window. The result is what may be termed a duplex lamination composed of two independent magnetic circuits which are eccentrically disposed with respect to each other.

Figure 4:
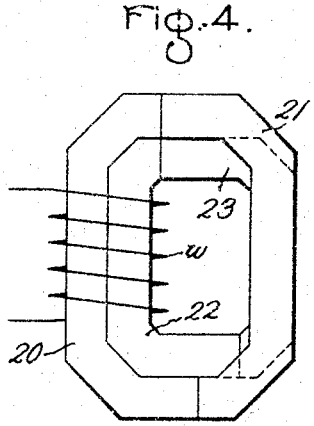

The winding $w$ for such type of lamination is preferably disposed thereon about the left-hand or wider portion as shown in Fig. 4. The right-hand leg composed of the sections 21 and 23 by this arrangement passes about the outside of the winding and these two sections are thus seen to be each equally distant from the winding $w$. It is now clear that the mean length of the magnetic circuit is considerably less than that of a lamination formed as has been the usual practice of a single sheet with the outer portion of the same width and cross section as the inner portion. It is also clear that there is a considerable saving in material and that the diameter of the assembled core will be considerably smaller.

The process of forming a lamination by arranging the parts so as to yield two magnetic circuits eccentrically disposed, I have termed "multiplexing"; it is of course evident that this multiplexing is not confined to the producing of a lamination having only two eccentrically disposed magnetic circuits but may be extended generally to provide a plurality of more than two eccentrically disposed magnetic circuits. In Fig. 6 an arrangement is shown having three magnetic circuits, the outer one composed of sections 24 and 25, the intermediate one composed of sections 26 and 27, and the inner one composed of sections 28 and 29. The left-hand leg is composed of the sections 24, 26 and 28 which are arranged edge to edge so as to form one layer in the same plane and surrounded by the winding $v$; while the right-hand leg is composed of the sections 25, 27 and 29, which are arranged so as to form three layers in different planes and face to face, these latter sections being substantially equally spaced from the turns of the winding $v$. In this arrangement, the left-hand or winding leg is three times as wide but only one-third as thick as the opposite or outer leg and both have the same cross section.

The result of this multiplexing process is a multiplex core lamination having a shorter mean magnetic flux path than if the lamination were made in accordance with the former practice of making it of a single flat sheet, which practice may be termed "simplexing" to distinguish it from the multiplexing process which is herein disclosed. The further the process of multiplexing is carried, and by this is meant the greater the number of eccentrically disposed magnetic circuits which form a lamination, the shorter will become this mean flux path, but of course this subdividing of the laminations cannot be carried beyond the point where the combined thickness of the laminations in the outside legs of the core is sufficient to completely surround the periphery of the winding.

Among the operating economies effected by this shortening of the mean length of magnetic flux path is the reduction of weight of magnetic material in the lamination, a reduction in the number of ampere-turns needed to circulate the required magnetic flux in the laminations and corresponding reductions in the so-called copper and iron losses in the apparatus. Since fewer ampere-turns are required, the winding space remaining the same, a larger conductor may be employed with still further reduction in losses. The cumulative effect of these reductions in losses is a materially lower rate of rise in the temperature of the apparatus. It hence runs cooler for a given load than apparatus of former constructions. My invention therefore provides a mode of constructing an apparatus from a given weight of manufacturing materials (for example, copper, iron and insulation) which is susceptible of a higher rating than has heretofore been possible; or a lighter apparatus for a given rating may be built with a smaller external diameter than has heretofore been possible, so that it may be housed in a smaller casing with a corresponding saving in insulating fluid.

In Fig. 1, the distributed core is made up of three dovetailed groups of laminations, a few of the outside laminations of each group being simplex in order mechanically better to protect the inner multiplex ones. The contour of the outside or simplex laminations of each group is shown in full lines in Fig. 2, such simplex laminations having uninterrupted wide yoke portions 30 and relatively narrow outer leg portions 31. The use of multiplex laminations in the type of distributed core here shown gives the outer legs the appearance of being fanned out circumferentially about the winding 14 and this is desirable from the standpoint of magnetic flux distribution about the winding as well as for various other reasons already stated. The contour of the inner magnetic circuit of the multiplex laminations is indicated by broken lines in Fig. 2.

In Figs. 7 and 8, there is shown a distributed core in which the multiplexing is accomplished by groups of sections forming inner and outer magnetic circuits eccentrically arranged instead of by multiplexing each individual lamination. Here the core is composed of three major groups of laminations dovetailed together to form a central winding leg 32 and three outer legs 33, 34 and 35. Considering now the leg 35 (which is shown as being identical with legs 33 and 34), it is seen that there is a lower or left-hand group $p_0$ of O-shaped simplex laminations located on the outside; next to them is a group of laminations $p_1$ having the dimensions of the inside magnetic circuit $d'-e'$, shown in Figs. 8 and 9. Next to group $p_1$ is a group $p_2$ of laminations having the dimensions of the outer magnetic circuit $c'-f'$, shown in Fig. 9, within the left-hand leg portion of which nests the left-hand leg portion of the group $p_1$. Next to group $p_2$ are other groups, $p_3$ and $p_4$ respectively, of inside and outside lamination members; next to these is another group $p_5$ and $p_6$ of inside and outside lamination members respectively; and then there is a group $p_7$ of specially dimensioned outside simplex laminations similar to the group $p_0$. These eight groups are assembled to form a major core group which in turn is adapted to be dovetailed with the other two to form a complete core and to yield a construction having ends with the staggered appearance shown in Fig. 8. This core is adapted to carry a transformer winding in substantially the same manner as that shown in Fig. 1. The staggered arrangement of the ends of the groups particularly facilitates the action of the cooling medium by presenting an increased heat radiating surface.

Fig. 10 shows a core assembly making use of laminations in which the multiplexing process has been carried to a point yielding three eccentrically disposed magnetic circuits as indicated in Fig. 12.

The core shown in Fig. 10 has a central leg 41 and outside legs 42, 43 and 44. Considering now the leg 42, it is seen to be composed of a group $q_0$ of simplex laminations; then a multiplex group $q_1$ of which Fig. 12 is an elevation. This group consists of an inner circuit $l'—m'$, an intermediate circuit $j'—k'$, and an outer circuit $g'—h'$. Next to this is a final multiplex or duplex group $q_2$ having but two circuits. In order to build up the winding perimeter of the central leg 41, wooden wedges 45, 46 and 47 are assembled along the angular recesses obtaining at the meeting edges of the dovetailed core groups.

In the core shown in Fig. 11, an arrangement of laminations is employed so that the use of wooden wedges to build up the winding perimeter is less desirable. This core is the same as that shown in Fig. 10 except that the wooden wedges are omitted and a group $g$ of simplex laminations is provided outside the duplex laminations so that each outside leg of the core is covered and protected at each side by a group of simplex laminations.

Fig. 13 shows an arrangement of radially extending core sections or frames of suitable magnetic material such as sheet iron, the legs of each section being of uniform cross sectional dimensions. The core sections or frames are composed in part of multiplex laminations arranged in a manner yielding six outside legs 61, 62, 63, 64, 65 and 66 and one central or winding leg 67. In each of the legs 61, 63 and 65, the arrangement shown has only one group composed of laminations which are wholly multiplex. This is the group $r_1$ in the leg 63, an elevation of which is shown in Fig. 17 and a section in Fig. 16. This group has an outside magnetic circuit composed of sections 68 and 69; an intermediate circuit composed of the inside section 70 and an outside section which is broken away in Figs. 16 and 17 and which is disposed at an angle of 60° to the plane of the sections 68 and 69; and an inside circuit composed of sections 71 and 72. At opposite sides of the multiplex group $r_1$ are simplex groups of laminations $r_2$ and $r_3$ which go to complete the leg 63. These groups are of the same dimensions as the inside circuit above described and composed of members the same in size. The leg portions which go to make up the central leg 67 occupy the small space shown in cross-section at 73 in Fig. 15. In the group $r_3$, the laminations are likewise the same in size as in group $r_2$, their leg portions which go to make up the central leg 67 occupying the space shown in section at 74 in Fig. 15.

In the leg 64, the laminations are all the same size, i. e. the size of the circuit made from members 70. That group thereof which may be deemed to be associated with the group $r_1$ in the multiplexing thereof is the middle group $r_4$. The leg portions of this group which go to make up the central leg 67 occupy the prism shown in section at 70 in Fig. 15. This group $r_4$ is of course simplex as well as the groups $r_5$ and $r_6$ to each side thereof whose inner leg portions occupy the spaces denoted respectively 70' and 70'' in Fig. 15. As seen from the drawing, the leg 64 extends at an angle of 60° away from the legs 63 and 65, a portion of its members extending toward and nesting inside but at an angle to the members in the laminations of group $r_1$; the whole core when assembled of sections of these types yielding the construction with six outside legs as illustrated and having a multiplex central leg 67 made up of substantially three concentric rows of laminations nested together. As a result of the interleaving of the laminations in the outer vertical legs 61, 63 and 65, the horizontal connecting legs between the ends of these outer legs and the ends of the inner or central winding leg are curved along their sides as shown in Fig. 13. The inner or central winding leg or pole of the core is hexagonal in cross section and comprises the inner rhombic shaped vertical legs of the several core sections or frames, the outer vertical legs of which are disposed in a circle about the outer face of the winding space.

Fig. 18 shows an arrangement adapted to give a four outside legged construction of distributed core. Here the core is composed of outside legs 81, 82, 83 and 84, and a central leg 85. Considering now the leg 82, it is seen to be composed of a multiplexed group of laminations $S_1$, as seen in elevation in Fig. 19, having an outside magnetic circuit 86 and an inside circuit 87 eccentric thereto. Outside the group $S_1$ are groups $S_2$ and $S_3$ of simplex laminations. Thus by taking four sections composed of groups $S_1$ $S_2$ and $S_3$ as described, a construction is had which is adapted to be dovetailed together in the manner shown.

Fig. 20 shows the result of using a larger number of multiplex and a smaller number of simplex laminations than were used in Fig. 18. This increased group of multiplex laminations is indicated at $S''$ and has at either side a group of simplex laminations to form a section adapted to dovetail with others. The result of thus increasing the number of laminations in the group $S''$ is the formation of the square channel or opening 90 through the core along the winding axis. This channel can advantageously be employed for ventilating purposes.

In the present disclosure of the invention, various arrangements of simplex, duplex and triplex laminations have been described and which clearly illustrate its principles and advantages. These are merely illustrative, however, and many other arrangements may easily be devised.

Having now described several embodiments of my invention which are at present among the best means known to me for carrying the same into effect, I would have it understood that these are merely illustrative, and that I do not mean to be limited thereby to the precise details shown nor restricted in the choice of recognized equivalents except as defined in my claims hereunto annexed.

What I claim as new and desire to secure by Letters Patent of the United States, is:—

1. In electrical apparatus, a core lamination comprising two magnetic elements, each of said elements having an opening, and an electrical winding traversing the opening and surrounding one side of each of said elements, there being a space between the inner face of said winding and the adjacent edge of the opening in one of said elements, the surrounded side of said other element extending into said space, and the outer sides of said elements being substantially equidistant from the outer face of said winding.

2. In electrical apparatus, a core lamination comprising two magnetic elements, each of said elements having an opening, and an electrical winding traversing the opening and surrounding one side of each of said elements, said elements having portions within the winding disposed edge to edge in one layer and portions outside the winding disposed face to face in two layers.

3. In electrical apparatus, a magnetic core comprising elements each having an opening to provide a winding space, and an electrical winding traversing said winding space, part of said elements having portions disposed within the openings of other elements and other parts disposed outside said openings.

4. In electrical apparatus, a magnetic core comprising a lamination disposed about a winding space, and an electrical winding traversing said winding space, said lamination having one side wider and thinner than its other side and being formed to provide a magnetic circuit of uniform cross section.

5. A transformer core, comprising a plurality of radially extending sheet iron frames of uniform dimensions, each having an inner vertical leg, an outer vertical leg, and a pair of horizontal legs, connecting the ends of said vertical legs, the inner legs of the frames being disposed in contiguous relation in at least two layers and forming a central pole, the sectional form of the inner legs being rhombic and the outer vertical legs disposed in a circle.

6. A transformer core, comprising radially extending sheet iron frames of uniform dimensions, each having an inner vertical leg, an outer vertical leg, and a pair of horizontal legs connecting the ends of said vertical legs, the inner legs of the frames being disposed in contiguous relation in at least two layers and forming a central pole of hexagonal section, the sectional form of the inner legs being rhombic and the outer vertical legs disposed in a circle.

7. A transformer core, comprising radially extending sheet iron frames of uniform dimensions, each having an inner vertical leg, an outer vertical leg and a pair of horizontal legs connecting the ends of said vertical legs, said connecting legs being curved along their sides, the inner legs of the frames being disposed in contiguous relation in at least two layers and forming a central pole of hexagonal section, the sectional form of the inner legs being rhombic and the outer vertical legs disposed in a circle.

In witness whereof, I have hereunto set my hand this seventeen (17) day of February, 1922.

SVEND E. JOHANNESEN.